United States Patent
Asuma et al.

(10) Patent No.: US 6,275,279 B1
(45) Date of Patent: Aug. 14, 2001

(54) LIQUID CRYSTAL DISPLAY PANEL WHEREIN END-SEALING MATERIAL CONTAINS PARTICULATES LARGER THAN GAP FORMED BY LIQUID CRYSTAL FILLING PORT

(75) Inventors: Hiroaki Asuma; Shigeru Matsuyama; Tohru Sasaki; Noboru Kunimatsu; Masamitsu Furuie, all of Mobara (JP)

(73) Assignee: Hitachi, LTD, Tokyo (JP)

( * ) Notice: Subject to any disclaimer, the term of this patent is extended or adjusted under 35 U.S.C. 154(b) by 0 days.

(21) Appl. No.: 09/452,145

(22) Filed: Dec. 1, 1999

(30) Foreign Application Priority Data

Dec. 1, 1998 (JP) .................................. 10-341875

(51) Int. Cl.$^7$ ...................... G02F 1/1339; G02F 1/1341
(52) U.S. Cl. ...................... 349/153; 349/154; 349/189; 349/190
(58) Field of Search .................................. 349/153, 154, 349/189, 190

(56) References Cited

U.S. PATENT DOCUMENTS

| | | | |
|---|---|---|---|
| 4,264,150 | * 4/1981 | Yano et al. | 350/357 |
| 4,470,669 | * 9/1984 | Kubota et al. | 350/351 |
| 4,610,510 | * 9/1986 | Funada et al. | 350/334 |
| 4,820,025 | * 4/1989 | Nakanowatari | 350/334 |
| 5,184,239 | * 2/1993 | Sano et al. | 359/80 |
| 5,202,779 | * 4/1993 | Shinomiya | 359/78 |
| 5,513,026 | * 4/1996 | Suzuki et al. | 359/81 |
| 5,771,084 | * 6/1998 | Fujimori et al. | 349/153 |
| 6,118,509 | * 9/2000 | Miyake | 349/153 |

FOREIGN PATENT DOCUMENTS

| | | |
|---|---|---|
| 56-32124 | * 4/1981 | (JP) . |
| 58-48025 | * 3/1983 | (JP) . |
| 5-53124 | * 3/1993 | (JP) . |
| 6-148656 | * 5/1994 | (JP) . |
| 6-273779 | * 9/1994 | (JP) . |

* cited by examiner

*Primary Examiner*—William L. Sikes
*Assistant Examiner*—Tarifur R. Chowdhury
(74) *Attorney, Agent, or Firm*—Antonelli, Terry, Stout & Kraus, LLP

(57) ABSTRACT

In a liquid crystal display panel, the shrinkage of an end-sealing material for sticking a pair of substrates together is prevented or relaxed to restrain peeling of the end-sealing material from the substrates, thereby preventing any leakage of a liquid crystal and penetration of contaminants. A liquid crystal display device is assembled by bonding together a pair of substrates, which are opposed to each other across a predetermined gap and at least one of which has an electrode group formed over a surface opposed to the other substrate, with a sealing material along their peripheries excluding a liquid crystal filling port, and then sealing the liquid crystal filling port with an end-sealing material after the filling of the liquid crystal and hermetically sealing the liquid crystal in the gap between both substrates. In the liquid crystal display device, a resin which constitutes the end-sealing material contains particulates of average particle size of 0.1 $\mu$m to 3.5 $\mu$m by at least 1 volume % to 30 volume %, preferably, 1 volume % to 10 volume %.

10 Claims, 11 Drawing Sheets

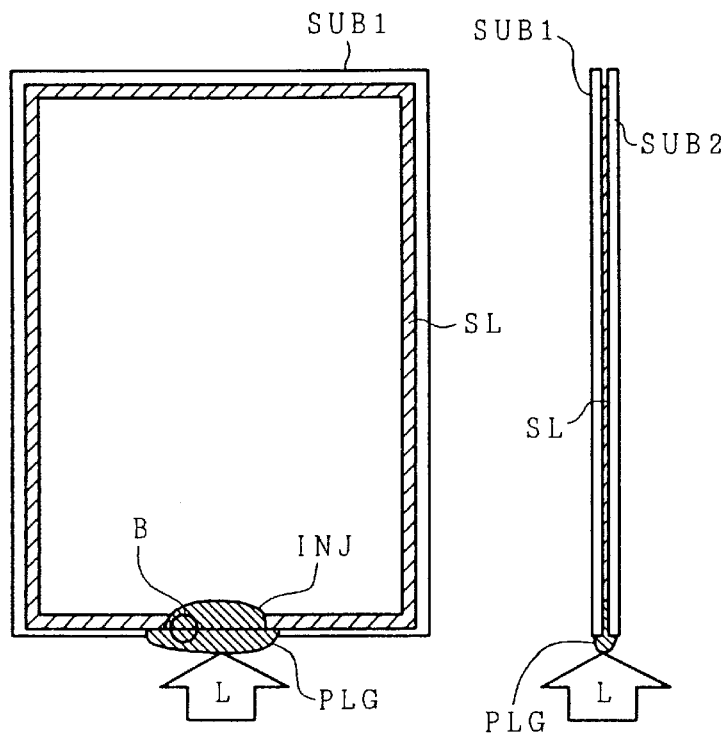
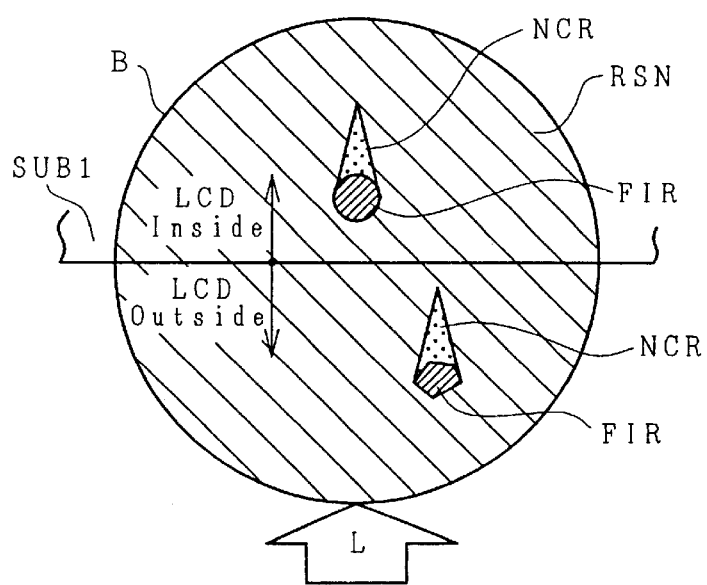

CONTENT RATIO OF PARTICULATES
(VOLUMETRIC PERCENTAGE; Vol%)

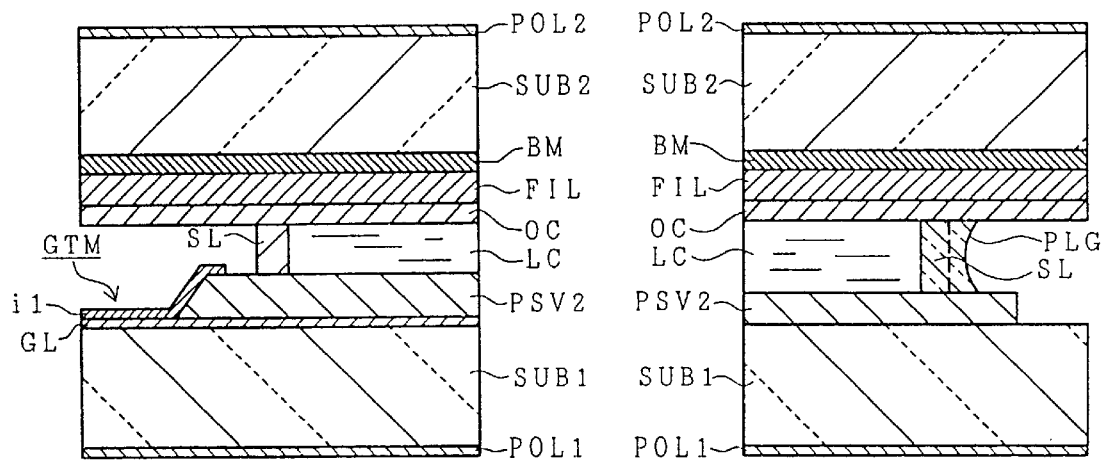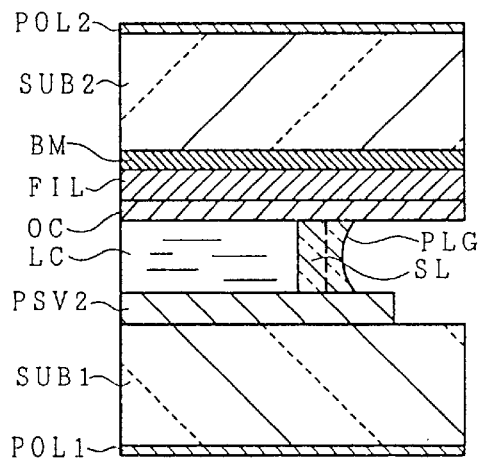
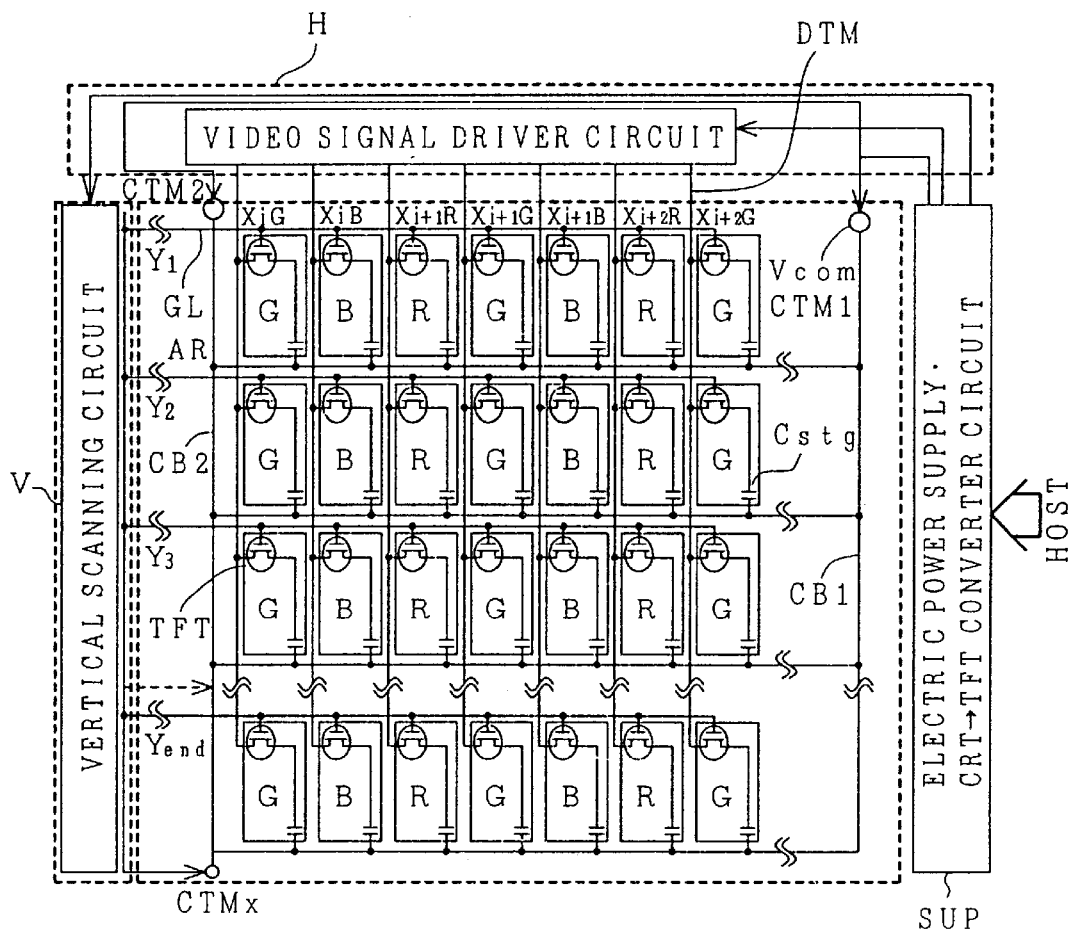

*FIG. 15A*  *FIG. 15B*
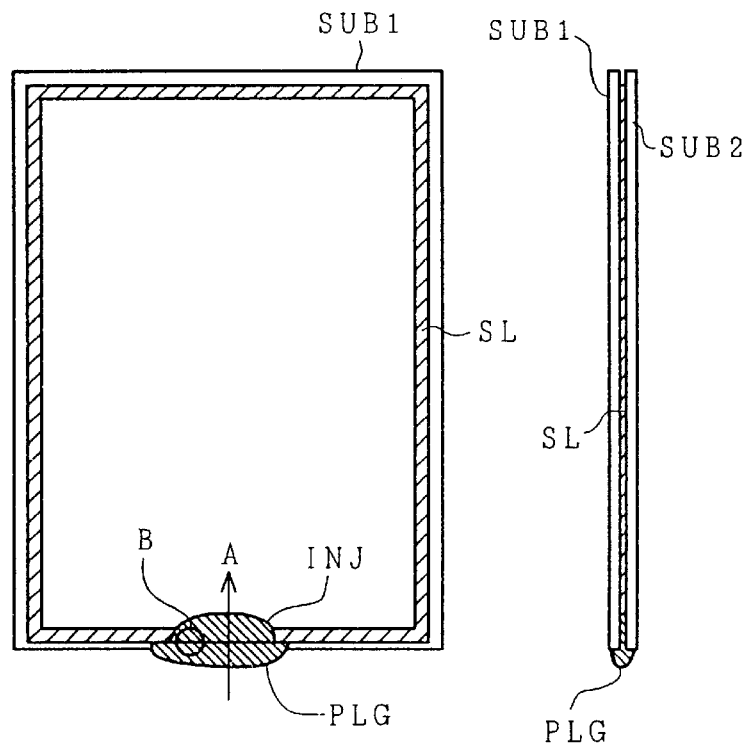
*FIG. 16*
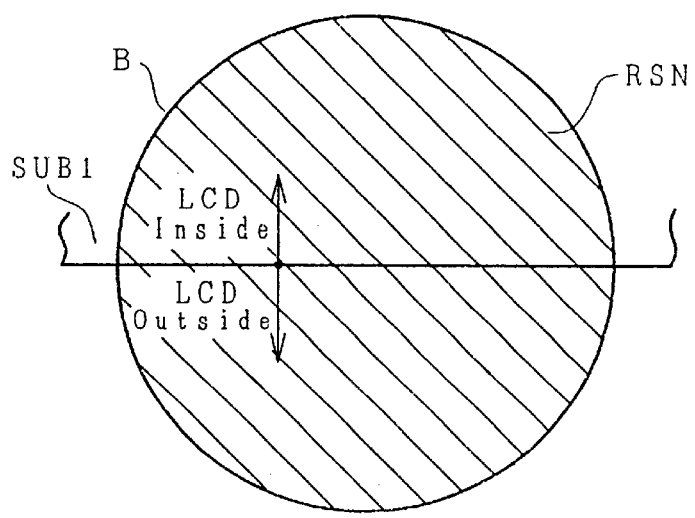

LIQUID CRYSTAL DISPLAY PANEL WHEREIN END-SEALING MATERIAL CONTAINS PARTICULATES LARGER THAN GAP FORMED BY LIQUID CRYSTAL FILLING PORT

BACKGROUND OF THE INVENTION

The present invention relates to a liquid crystal display panel and, more particularly, to a liquid crystal display panel which exhibits reliability by preventing defective sealing due to the shrinkage of an end-sealing material which seals a liquid crystal filling port.

Liquid crystal display devices are widely used for displaying various types of images, such as still images or kinetic images.

Liquid crystal display panels which constitute this kind of liquid crystal display device are generally divided into two types according to the structure of the electrodes which are formed over at least one of a pair of substrates which are opposed to each other across a predetermined gap into which liquid crystal compounds have been injected. One type is a simple matrix type. In the simple matrix type, two substrates each having a plurality of stripe-shaped transparent electrodes arranged over a main surface are opposed to each other so that the stripe-shaped electrodes of both substrates cross each other and the intersecting portions of the stripe-shaped electrodes constitute a two-dimensional matrix, each of the intersecting portion forming a pixel. The other group is called an active matrix type, and in this type electrodes formed over either one of two substrates are separated from one another for each pixel and an element having a switch function, such as a thin-film transistor, is provided for each pixel.

Active matrix liquid crystal display devices using active elements represented by thin-film transistors (TFTS) have been widely used as display terminals for OA equipment or the like because of their thin size and light weight, as well as their high image quality, which compares favorably with Braun tubes.

The display methods of liquid crystal display devices using thin-film transistors (TFTS) are generally classified into the following two methods. In one of the methods, a layer of liquid crystal compounds (hereinafter referred to simply as a liquid crystal layer or a liquid crystal) is interposed between two substrates (such as transparent glass substrates) with each substrate having a transparent electrode, and a voltage is applied across both transparent electrodes to generate a vertical field which will vary the direction of orientation of molecules in the liquid crystal layer, whereby fight which has passed through the transparent electrodes and enters the liquid crystal layer is modulated to display an image. This method is adopted by a considerably large number of current popular products.

In the other method, two electrodes are arranged on only one of the two substrates in a state such that they are spaced apart from each other, and a voltage is applied across the two electrodes so that a field nearly parallel, to the main surfaces of the substrates is generated in the liquid crystal layer to vary the direction of orientation of molecules in the liquid crystal layer, whereby light which has entered the liquid crystal layer through the gap between the two electrodes is modulated to display an image. Although there are few products which use this method, the method is a promising technique for active matrix liquid crystal display devices because of the ability to provide remarkably wide viewing angles.

A liquid crystal display device which adopts the former method is disclosed in, for example, Japanese Patent Laid-Open No. 309921/1988, and a liquid crystal display device which adopts the latter method and the features of such liquid crystal display device are disclosed in Japanese Patent Publication No. 505247/1993, Japanese Patent Publication No. 21907/1988 and the like.

All of the above-described active matrix types of liquid crystal display devices are provided with switching elements which respectively correspond to a plurality of pixel electrodes arrayed in a matrix form. In such an active matrix type of liquid crystal display device, since the liquid crystal in each pixel is theoretically driven at all times, good contrast is obtained compared to a simple matrix type of liquid crystal display device which is driven in a time-division manner. For this reason, the active matrix liquid crystal driving method is a technique which is particularly indispensable for color display.

A liquid crystal display device is prepared by bonding together two insulating substrates at least one of which is made of a transparent material such as glass, with a sealing agent along their respective peripheries, sealing a liquid crystal between the substrates to form a liquid crystal display panel, attaching constituent components such as a driving circuit, a polarizer and various optical sheets to the liquid crystal display panel, and incorporating the liquid crystal display panel together with the constituent components between a back fight assembly and a metal frame (a metallic shield case).

FIGS. 15A and 15B are explanatory views of a conventional structure of a sealing portion of such a liquid crystal display panel, and FIG. 16 is an enlarged view of a portion B of FIG. 15A.

In the liquid crystal display panel, two substrates SUB1 and SUB2 are opposed to each other across a predetermined gap and are bonded together by a sealing material SL inserted therebetween along the periphery of a display area. Incidentally, in the case of an active matrix type of color liquid crystal display panel, color filters for plural colors which are partitioned by a black matrix are formed over one of two substrates (an upper substrate) and switching elements for pixel selection are formed over the other substrate (a lower substrate).

The sealing material SL is stuck to the main surfaces of both substrates SUB1 and SUB2 along the peripheries thereof, and a portion of the sealing material SL is interrupted to form a filling port INJ for filling a liquid crystal. After the sealing material SL is cured, a liquid crystal is filled into the gap between the substrates SUB1 and SUB2 through the filling port INJ, and after that, the filling port INJ is sealed with the end-sealing material PLG.

The end-sealing material PLG enters into the gap between the substrates SUB1 and SUB2 through the filling port INJ and cross-bridges the sealing material SL, and sticks to each of the main surfaces of the substrates SUB1 and SUB2. If the end-sealing material PLG is cured in this applied state, the filling port INJ is hermetically closed.

A thermosetting or photosetting resin using an epoxy resin or the like is used as the end-sealing material PLG. In particular, a photosetting type of resin which can be cured by ultraviolet light or short-wavelength visible light is used in terms of quick curing and storage stability.

The photosetting resin (resin being set or cured by light-irradiation) is composed of only resin components such as a photo polymerization initiator, a cross bridging agent and a silane coupling agent.

The required characteristics of the end-sealing material are (1) adhesion to a liquid crystal sealing portion (compatibility to a liquid crystal; low shrinkage during curing) and (2) high purity and non-contamination.

These required characteristics will be further described. Regarding characteristics (1), the liquid crystal remains in the filling port INJ of the liquid crystal display panel and is difficult to completely remove by cleaning, so that the adhesion of the end-sealing material to the substrates lowers. If this adhesion is to be improved, it is necessary that the end-sealing material PLG be incapable of being repelled by the liquid crystal (affinity for liquid crystals), i.e., the end-sealing material PLG should have a certain degree of compatibility to liquid crystals.

In addition, if the shrinkage due to curing is excessively large, the end-sealing material peels off the substrates and its sealing characteristics lower.

Regarding characteristic (2), if a component of the end-sealing material PLG melts into the liquid crystal, a lowering of the resistance value of the liquid crystal is incurred and the retention efficiency of the liquid crystal decreases, so that display characteristics may become non-uniform in the screen. Because the end-sealing material contacts the liquid crystal in a non-cured state, it is particularly important to protect the liquid crystal from contamination.

In a sealing step for an end-sealing material using a photo-setting resin., in order to prevent constituent members (such as a liquid crystal, an alignment layer and a sealing material) of a liquid crystal display panel from being degraded by ultraviolet light, it is desirable that the amount of ultraviolet light required for curing be made as small as possible. If the liquid crystal, the alignment layer, the sealing material or the like is damaged by ultraviolet light, the display characteristics may become nonuniform in the screen.

As shown in FIG. 16, a resin RSN which constitutes the end-sealing material PLG is applied so that the resin RSN penetrates into the inside (in FIG. 16, the inside of the LCD) of the filling port INJ (between the two substrates SUB1 and SUB2) so as to bond together both substrates SUB1 and SUB2 and seal the filling port INJ, and, moreover, covers the filling port INJ at a side edge of the two substrates SUB1 and SUB2 which are bonded together (an outside edge of the substrates: in FIG. 16, the outside of the LCD).

In this manner, the filling port INJ is hermetically sealed and the liquid crystal is shut off from the outside atmosphere.

SUMMARY OF THE INVENTION

An end-sealing material which seals a filling port after a liquid crystal is filled into the gap between the two substrates of a liquid crystal display panel shrinks due to curing treatment. If this shrinkage becomes large, the end-sealing material peels off the substrates and the liquid crystal may leak out through the resulting opening or a contaminant may penetrate into the liquid crystal from outside.

Accordingly, an object of the present invention is to provide a liquid crystal display panel which is prevented from suffering from leakage of a liquid crystal and penetration of contaminants by preventing or reducing the shrinkage of such end-sealing material and eliminating any decrease in the airtightness of a filling port due to the peeling of the end-sealing material from the substrates.

To achieve the above object, the present invention decreases the cure shrinkage (the extent to which a resin shrinks during curing) by adding particulates to an end-sealing material and relaxing the internal stress of the end-sealing material during the curing thereof Specifically, the present invention is characterized b the following constructions (1) to (8).

(1) A liquid crystal display panel according to the present invention comprises a liquid crystal panel including: a pair of substrates which are opposed to each other across a predetermined gap, at least one of which is transparent; an electrode group formed over either or both of opposing internal surfaces of the pair of substrates; an alignment control layer for aligning a molecular orientation of a liquid crystal in a predetermined direction, the alignment control layer deposited over each of the internal surfaces of the pair of substrates; a sealing material for bonding peripheries of the pair of substrates to each other, excluding a liquid crystal filling port; an end-sealing material for sealing the liquid crystal filling port after filling the liquid crystal and hermetically seating the liquid crystal in the gap; and a polarizer stacked over a surface of at least one of the pair of substrates, wherein the liquid crystal display panel is characterized in that the end-sealing material is made of a resin which contains particulates of average particle size of 0.1 $\mu$m to 3.5 $\mu$m within a range of 1 volume % to 30 volume %, preferably, 1 volume % to 10 volume %.

(2) The liquid crystal display panel defined in (1) is characterized in that the particulates contained in the end-sealing material have a transmissivity of at least I% or more with respect to light having a wavelength of 200 nm to 500 nm.

(3) The liquid crystal display panel defined in (1) or (2) is characterized in that the particulates contained in the end-sealing material are formed of at least two groups having different average particle sizes.

(4) The liquid crystal display panel defined in (1), (2) or (3) is characterized in that the particulates contained in the end-sealing material are those of any of $SiO_2$, a hard resin and glass.

(5) The liquid crystal display panel defined in (1), (2) or (3) is characterized in that the particulates contained in the end-sealing material contain particulates treated with a silica coupling material, the particulates being those of any of $SiO_2$, a hard resin and glass.

(6) A liquid crystal display panel according to the present invention comprises a liquid crystal panel including: a pair of substrates which are opposed to each other across a predetermined gap, at least one of which is transparent; an electrode group formed over either or both of the opposing internal surfaces of the pair of substrates; an alignment control layer for aligning a molecular orientation of a liquid crystal in a predetermined. direction, the alignment control layer being deposited over each of the internal surfaces of the pair of substrates; a sealing material for bonding peripheries of the pair of substrates to each other, excluding a liquid crystal filling port; an end-sealing material for sealing the liquid crystal filling port after filling the liquid crystal and hermetically sealing the liquid crystal in the gap; and a polarizer stacked over a surface of at least one of the pair of substrates, wherein the liquid crystal display panel is characterized in that the end-sealing material contains particulates larger in particle size than the gap in an outside area of the liquid crystal filling port.

(7) The liquid crystal display panel defined in (6) is characterized in that the particulates contained in the end-sealing material are those of any of $SiO_2$, a hard resin and glass.

(8) The liquid crystal display panel defined in (6) is characterized in that the end-sealing material contains particulates treated with a silica coupling material, the particulates being those of any of $SiO_2$, a hard resin and glass.

In the above-described constructions, since the particulates mixed with the end-sealing material differ in surface area according to the particle size of the particulates even for the same weight and volume, the surface area per unit volume becomes larger as the particle size becomes smaller.

For example, in the case of particulates of particle size (actually, average particle size) of 0.1 µm, the surface area per unit weight is 30 m²/g; in the case of particulates of particle size of 0.3 µm, the surface area per unit weight is 10 m²/g; and in the case of particulates of particle size of 3.5 µm, the surface area per unit weight is 1 m²/g.

If the surface area is large, the particulates become difficult to coat with a resin which constitutes the end-sealing material, resulting in the problem that the particulates are not mixed, with the resin of the end-sealing material or the viscosity of the end-sealing material increases and workability lowers.

For this reason, it is desirable that the average particle size of particulates to be mixed be 0.1 µm to 3.5 µm.

The mixing amount of particulates is determined by trade-off relationships among the amount of decrease in volume shrinkage due to the curing of the end-sealing material, an increase in difficulty of end-sealing material application work due to an increase in viscosity due to the mixing of the particulates, and whether the end-sealing material can be sufficiently injected into the gap between the substrates through a filling port.

FIG. 7 is a graph showing the characteristic of the variation of the volume shrinkage of an applied end-sealing material and the characteristic of the increase of the viscosity of the end-sealing material with respect to the volume % (volumetric percentages) of particulates mixed with a resin which constitutes the end-sealing material. The horizontal axis indicates the mixing ratio (as "Content Ratio of Particulates", in volume %) of the particulates, a vertical axis A indicates the volume shrinkage (as "Bulk Shrinkage Ratio", in relative value) of the end-sealing material during curing, and a vertical axis B indicates the viscosity coefficient (as "Viscosity", in relative value) of the end-sealing material.

In FIG. 7, the volume shrinkage of the end-sealing material during curing sharply decreases to a point AO at which the mixing amount of the particulates is 1% and the peeling of the end-sealing material from the substrates is greatly decreased, and hardly varies after the mixing amount exceeds 30%.

On the other hand, as the mixing amount of the particulates is increased, the viscosity gradually increases, and when the viscosity exceeds 30%, the application work of the end-sealing material becomes difficult. In other words, the viscosity exceeds a point $B_0$ indicative of a viscosity at which the application work of the end-sealing material is allowed.

From this fact, it is determined the mixing amount of the particulates in the end-sealing material needs to be at least 1 volume % to 30 volume %, and if safety against peeling and workability are taken into account, it is desirable to make the mixing amount 1 volume % to 10 volume %.

Incidentally, if the shapes of the particulates to be mixed are indefinite, the mixing amount of the particulates is defined with their maximum lengths.

In the case of an end-sealing material using a resin of an ultraviolet light and short-wavelength visible light-curing type, particulates to be mixed with the end-sealing material need to have transmissivity with respect to ultraviolet light and short-wavelength visible light. If ultraviolet light and short-wavelength visible light are blocked by particulates mixed with the end-sealing material, the end-sealing material is not cured, so that a non-cured portion of the end-sealing material melts into and contaminates a liquid crystal and may adversely affect display characteristics.

The light wavelength required to cure the end-sealing material mainly has peaks near 250 nm, 365 nm, 405 nm and 436 nm, and ranges from 200 nm to 500 nm. Therefore, it is desirable that particulates to be mixed with the end-sealing material have a transmissivity (an optical transmissivity) characteristic of at least 1% or more with respect to light of wavelength of 200 nm to 500 nm. According to the wavelength-vs-intensity profile of illuminating light to be used for curing the resin, even if the particulates do not have such a transmissivity characteristic over the aforesaid wavelength range, the particulates need only exhibit this transmissivity characteristic at one of the main wavelength peaks such as the above-described ones.

$SiO_2$, plastic particulates or glass particulates can be used as the particulates to be mixed with the end-sealing material. In addition, it is desirable to add a silane coupling material to the end-sealing material so that the end-sealing material has adhesion to glass plates which serve as substrates.

If particulates which include an inorganic material are mixed with the end-sealing material, there is a risk that the silane coupling material acts on the particulates in the end-sealing material and the silane coupling material which reacts to the glass plates decreases. Accordingly, there is a case in which it is desirable that particulates to be mixed with the end-sealing material be treated with a silane coupling material.

In accordance with the above-described construction, the shrinkage of the end-sealing material due to the curing thereof is prevented or reduced to prevent a decrease in the airtightness of the filling port due to the peeling of the end-sealing material from the substrates, whereby it is possible to provide a liquid crystal display panel which is prevented from suffering from leakage of a liquid crystal and penetration of contaminants.

These and other objects, features and advantages of the present invention will become more apparent from the following description when taken in conjunction with the accompanying drawings.

BRIEF DESCRIPTION OF THE DRAWINGS

FIGS. 1A and 1B are explanatory views of the structure of a sealing portion, illustrating a first embodiment of a liquid crystal display panel according to the present invention, wherein FIG. 1A shows a top plan thereof and FIG. 1B shows a cross-section thereof;

FIGS. 3A and 3B are explanatory views of the structure of a sealing portion, illustrating a second embodiment of the liquid crystal display panel according to the present invention, wherein FIG. 3A shows a top plan thereof and FIG. 3B shows a cross-section thereof;

FIG. 4 is an enlarged view of the portion surrounded by a circle B in FIG. 3A;

FIGS. 5A and 5B are explanatory views of the structure of a scaling portion, illustrating a fourth embodiment of the liquid crystal display panel according to the present invention, wherein FIG. 5A shows a top plan thereof and FIG. 5B shows a cross-section thereof;

FIGS. 10A and 10B are cross-sectional views illustrating the construction of edge portions, cut along line C—C of FIG. 9;

FIG. 11 is a schematic diagram showing the equivalent circuit and its peripheral circuit of a display matrix block of a liquid crystal display device using the liquid crystal display panel according to the present invention;

FIGS. 15A and 15B are top plan and sectional views, respectively, of a conventional structure of a sealing portion of a liquid crystal display panel; and FIG. 16 is an enlarged view of a portion B in FIG. 15A.

DETAILED DESCRIPTION

Embodiments of the present invention will be described below in detail with reference to various embodiments.

<<First Embodiment>>

Figures 1A, 1B:
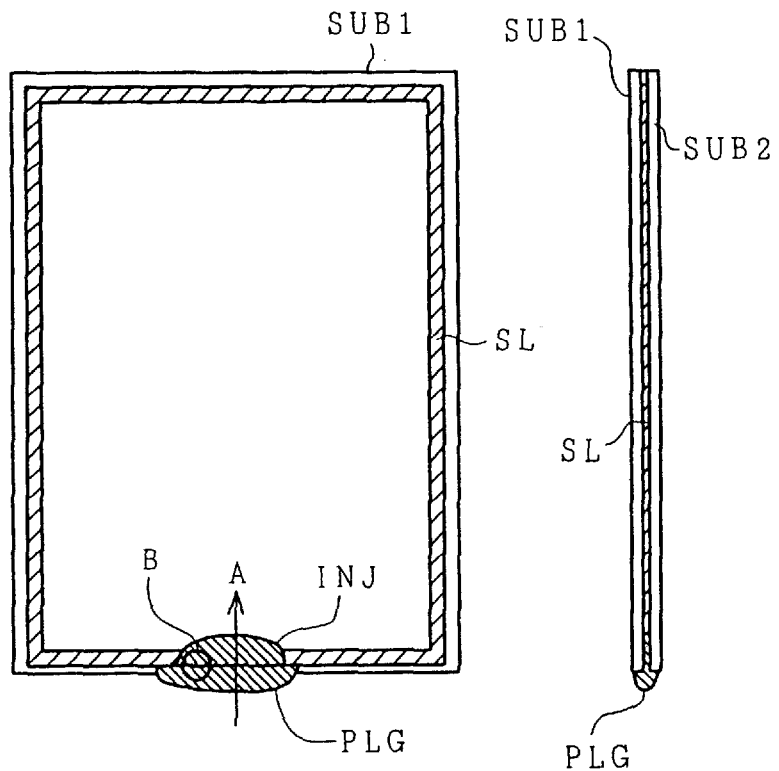
Figure 2:
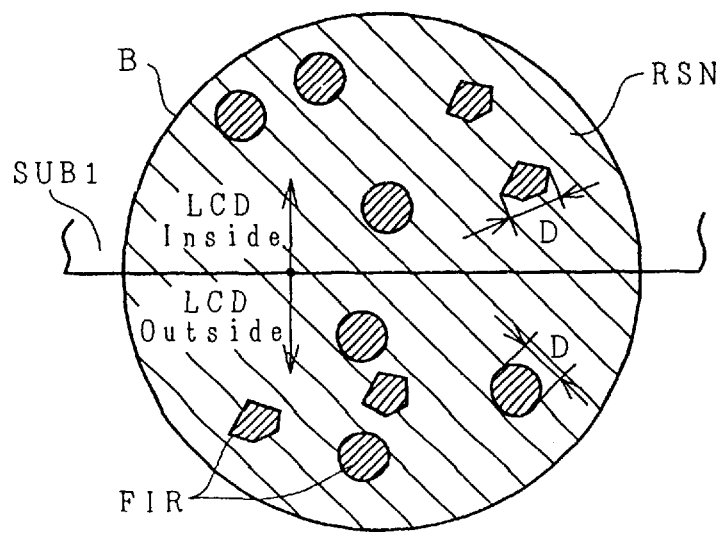
FIG. 2 is an enlarged view of the portion surrounded by a circle B in FIG. 1A.

FIGS. 1A and 1B are explanatory views of a conventional structure of a sealing portion, illustrating a first embodiment of a liquid crystal display panel according to the present invention, and FIG. 2 is an enlarged view of a portion B of FIG. 1A.

Figure 14:
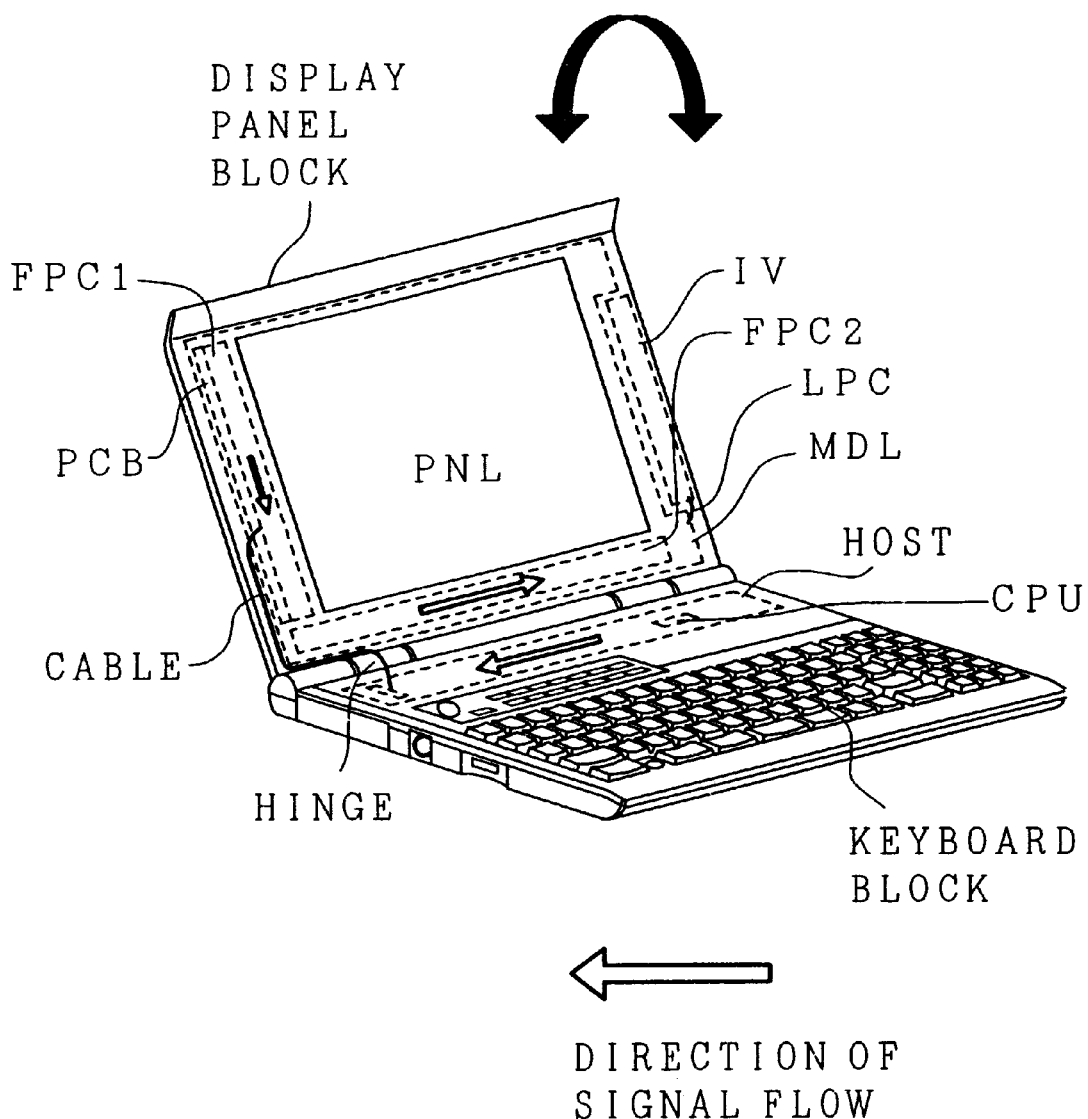
FIG. 14 is a perspective view of a portable personal computer which is one example of electronic equipment in which a liquid crystal display device using the liquid crystal display panel according to the present invention is mounted.

Similarly to FIG. 14 and FIGS. 15A and 15B referred to previously, FIGS. 1A and 1B and FIG. 2 show the state in which a filling port INJ is sealed with an end-sealing material PLG after a liquid crystal is filled into the portion between two substrate. In FIGS. 1A, 1B and 2, symbols identical to those used in FIGS. 14, 15A and 15B correspond to portions identical to those shown in the same figures.

In this embodiment, particulates FIR of $SiO_2$, a plastic material or a glass material of average particle size of 0.1 μm or more are mixed with a resin component RSN of the end-sealing material PLG within the range of 1 volume % to 30 volume %. Similarly to the end-sealing material PLG of the previously-described conventional example, a photo polymerization initiator, a cross bridging agent and a silane coupling agent are also added to or mixed with the end-sealing material PLG.

The portion of the filling port INJ is coated with the end-sealing material PLG, and part of the end-sealing material PLG is caused to penetrate into the clearance between the substrates by varying the ambient temperature from a high temperature to a low temperature to vary the pressure inside the clearance of the liquid crystal display panel, or by making use of the negative pressure of the clearance space by pressurizing and then depressurizing both substrates. Then, after having been coated with the end-sealing material PLG, the coated portion is illuminated with ultraviolet light or short-wavelength visible light to cure the end-sealing material PLG.

Accordingly, it is possible to decrease the cure shrinkage of the end-sealing material PLG during curing thereof and, provide a highly reliable liquid crystal display panel free from the peeling of the end-sealing material PLG.

<<Second Embodiment>>

In this embodiment as well, in a manner similar to that described above in the first embodiment, the particulates FIR of $SiO_2$, a plastic material or a glass material of average particle size of 0.1 μm or more are mixed with the resin component RSN of the end-sealing material PLG within the range of 1 volume % to 30 volume %, and the particulates FIR have transmissivity (an optical transmissivity) of 1 % or more with respect to light with a wavelength of 200 nm to 500 nm.

FIGS. 3A and 3B are explanatory views of the structure of a sealing portion, illustrating the second embodiment of a liquid crystal display panel according to the present invention, and FIG. 4 is an enlarged view of a portion B of FIG. 3A. In FIGS. 3A, 3B and 4, symbols identical to those used in FIGS. 1A, 1B and 2 correspond to portions identical to those shown in the same figures.

As shown in FIGS. 3A and 3B, after the filling port INJ has been coated with the end-sealing material PLG, the coated portion is illuminated with ultraviolet light or short-wavelength visible light in the direction indicated by an arrow L (in the direction of a side edge of the interfacial plane between the two substrates), in order to cure the end-sealing material PLG.

At this time, as shown in FIG. 4, if the illuminating light is interrupted by the particulates FIR, the resin component RSN in shadow portions indicated at NCR in FIG. 4 may not be cured because of an insufficient amount of light.

If the end-sealing material PLG remains non-cured, a component of a non-cured portion melts into the liquid crystal and the resistance value of the liquid crystal lowers. If the resistance value of the liquid crystal lowers, the retention efficiency of the liquid crystal decreases and the brightness of the display varies in the vicinity of the end-sealing material PLG as compared with the other display portion, resulting in a degradation of display quality.

For this reason, in the second embodiment, particulates having a transmissivity of 1% or more with respect to light having a wavelength of 200 nm to 500 nm is used as the particulates FIR mixed with the end-sealing material PLG.

Accordingly, it is possible to prevent the occurrence of non-curing of resin in portions covered with the shadows of the particulates FIR, whereby it is possible to decrease the cure shrinkage of the end-sealing material PLG during curing thereof and provide a highly reliable liquid crystal display panel free from the degradation of the characteristics of the liquid crystal.

<<Third Embodiment>>

In this embodiment, particulates of two kinds whose average particle sizes are 0.1 μm or more (the first kind of particulates has a particle size $D_1$ ($D_1 \geq 0.1$ μm) and the second kind of particulates has a particle size $D_2$ ($D_2 \geqq 0.1$ μm) and which differ from each other ($D_1 \neq D_2$) are used as the particulates FIR mixed with the end-sealing material PLG.

Accordingly, particulates of smaller particle size penetrate into the gap between the two substrates SUB1 and SUB2 in the filling port INJ shown in FIG. 2, which illustrates the first embodiment, while particulates of larger particle size remain outside the side edge of the interfacial plane between the two substrates SUB1 and SUB2.

In accordance with this construction, it is possible to prevent the occurrence of non-curing in the gap between the two substrates in the filling port INJ penetrated by particulates of smaller particle size, whereby it is possible to decrease the cure shrinkage of the end-sealing material PLG during the curing thereof and provide a highly reliable liquid crystal display panel which is free from problems such as the peeling of the end-sealing material PLG and the degradation of the characteristics of the liquid crystal.

<<Fourth Embodiment>>

Figure 5A:
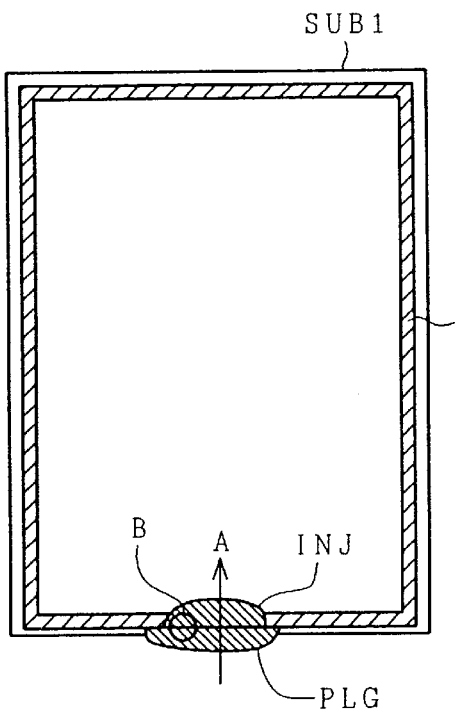
Figure 5B:
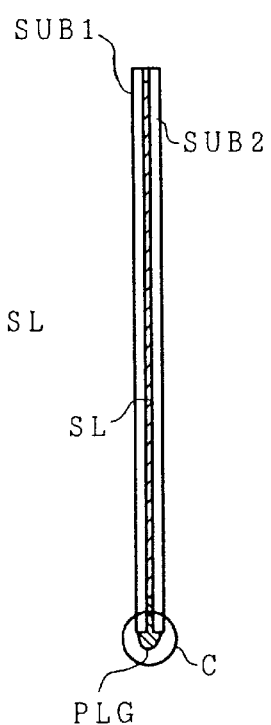
Figure 6A:
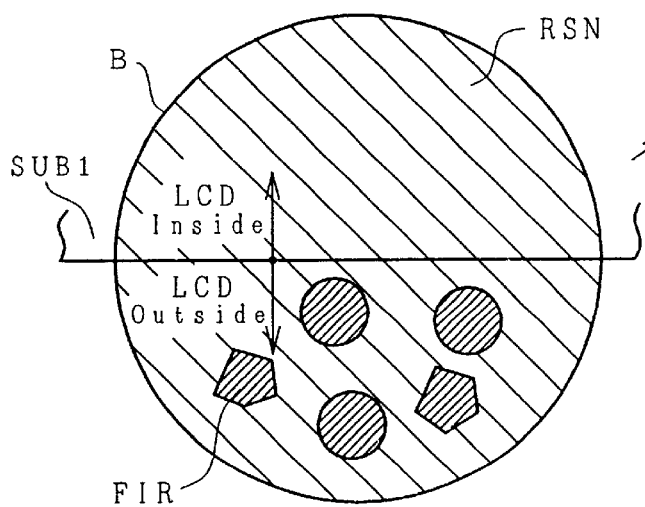
FIG. 6A is an enlarged view of the portion surrounded by a circle B in FIG. 5A.
Figure 6B:
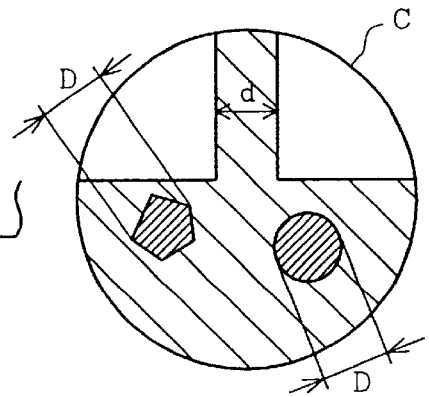
FIG. 6B is an enlarged view of the portion surrounded by a circle C in FIG. 5B.
Figure 7:
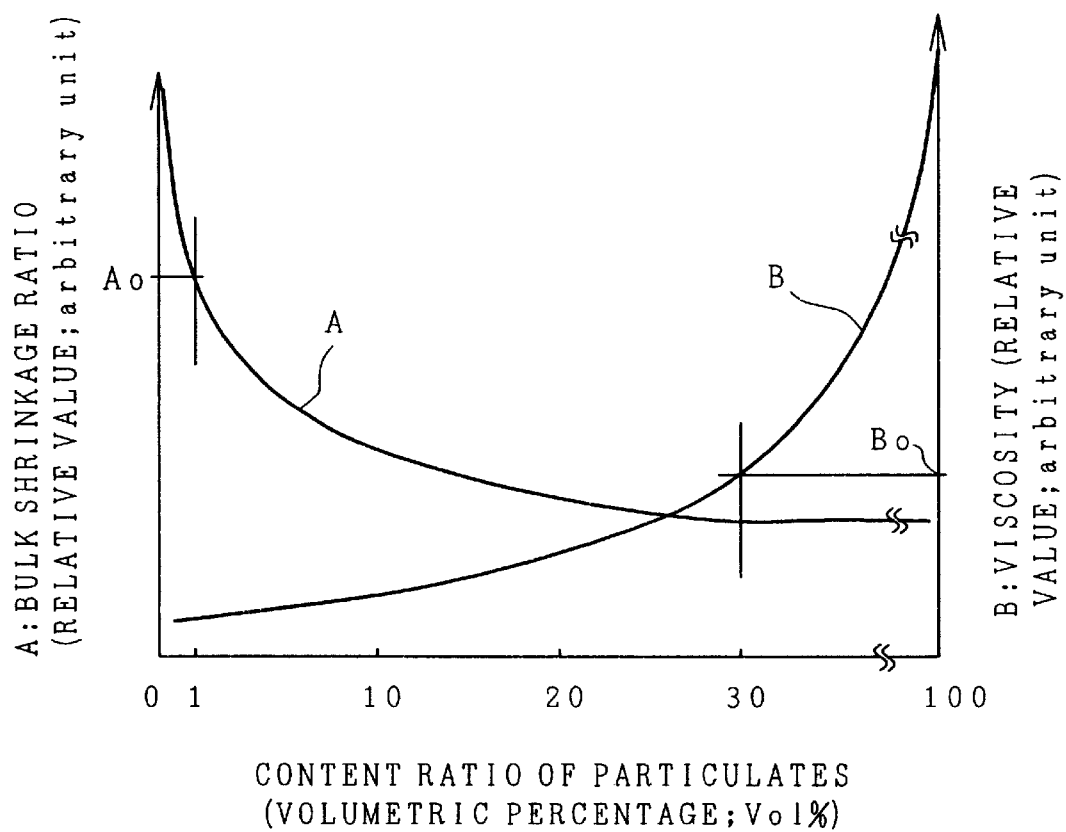
FIG. 7 is a graph showing the characteristic of the variation of the volume shrinkage of an applied end-sealing material (A: Bulk Shrinkage Ratio) and the characteristic of the increase of the viscosity of the end-sealing material (B: Viscosity) with respect to the volume % of particulates mixed with a resin which constitutes the end-sealing material (Content Ratio of Particulates)

FIGS. 5A and 5B are explanatory views of the structure of a sealing portion, illustrating a fourth embodiment of a liquid crystal display panel according to the present invention, and FIGS. 6A and 6B are enlarged views of portions B and C of FIGS. 5A and 5B, respectively. In FIGS. 5A, 5B, 6A and 6B, symbols identical to those used in the figures of each of the above-described embodiments correspond to portions identical to those shown in the same figures.

In this embodiment, particulates FIR having an average particle size D of 0.1 μm or more and greater than a gap of d μm between the two substrates are mixed with the end-sealing material PLG (the average particle size D is D>d).

Because the mixed particulates FIR have such an average particle size, as shown in FIGS. 6A and 6B, the particulates FIR do not penetrate into the portion (the inside of the LCD) between the two substrates SUB 1 and SUB2 in the filling port INJ and the end-scaling material PLG is applied so that the particulates FIR exist only outside the side edge of the interfacial plane between the substrates SUB1 and SUB2.

Therefore, in this embodiment, it is possible to decrease the shrinkage of the end-sealing material PLG during curing thereof on the outside of the side edge of the interfacial plane between the two substrates SUB1 andSUB2, whereby it is possible to provide a highly reliable liquid crystal display panel which is free from problems such as the peeling of the end-sealing material PLG similarly to each of the above-described embodiments and is prevented from suffering from leakage of the liquid crystal and penetration of contaminants.

<<Fifth Embodiment>>

In this embodiment, a material treated with a silane coupling agent is used as the end-sealing material PLG which is employed in the first embodiment described previously with reference to FIGS. 1A, 1B and 2.

If the particulates FIR, which essentially consist of an inorganic material, are mixed with a resin material, the silane coupling material in the resin material acts on the particulates FIR and a decrease in the amount of the silane coupling material, which reacts to the glass plates which constitute the substrates, is restrained so that the lowering of the adhesion of the end-seating material PLG to the substrates can be prevented.

In accordance with this embodiment, the shrinkage of the end-sealing material PLG due to the curing thereof is prevented or relaxed to solve a decrease in the airtightness of the filling port INJ due to the peeling of the end-sealing material PLG from the substrates, whereby it is possible to provide a highly reliable liquid crystal display panel which is prevented from suffering from leakage of the liquid crystal and penetration of contaminants.

The liquid crystal display panel according to the present invention and one example of a liquid crystal display device using the same will be described below.

Figure 8:
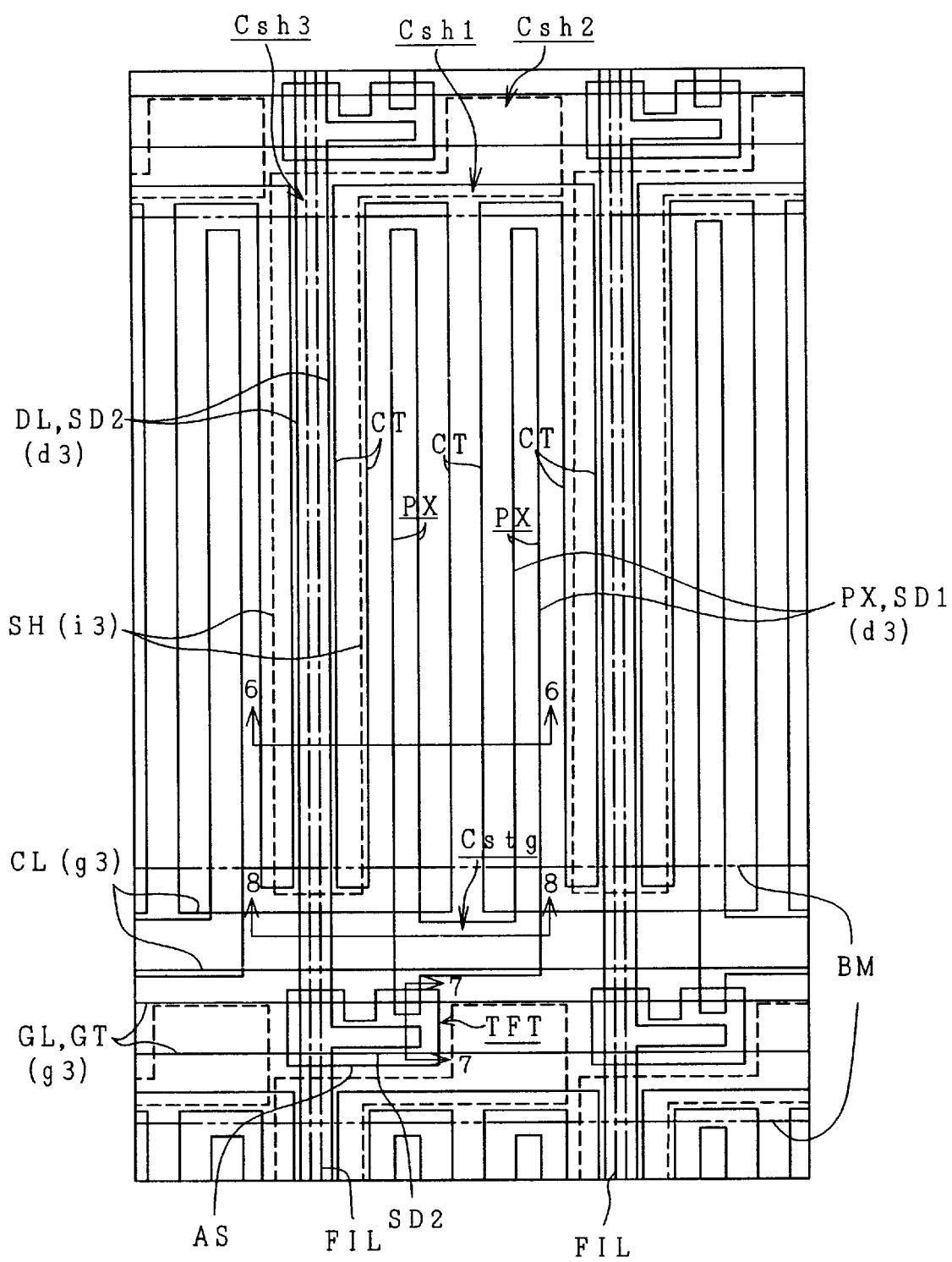
FIG. 8 is a plan view showing one pixel and a neighboring portion in an active matrix color liquid crystal display panel representing one example of the liquid crystal display panel according to the present invention.

FIG. 8 is a plan view showing one pixel and a neighboring portion of an active matrix color liquid crystal display panel representing one example of a liquid crystal display panel according to the present invention.

Referring to FIG. 8, each pixel is arranged in an area surrounded by four signal lines, i.e., the area enclosed by a scanning signal line (a gate signal line or a horizontal signal line) GL, a counter voltage signal line (a counter electrode line) CL and two adjacent video signal lines (drain signal lines or vertical signal lines) DL. Each pixel includes a thin-film transistor TFT, a storage capacitance Cstg, a pixel electrode PX and a counter electrode CT.

The gate line GL and the counter voltage signal line CL are disposed to be extended in the horizontal direction as viewed in FIG. 8, and a plurality of signal lines GL and CL are arranged in the vertical direction as viewed in the same figure. The video signal line DL is disposed to be extended in the vertical direction, and a plurality of video signal lines DL are arranged in the vertical direction. The pixel electrode PX is formed of a conductive layer d3 and is electrically connected to the thin-film transistor TFT via a source electrode SD1. In this case, the material of the source electrode SD1 is the same as that of the video signal line DL, but may also be a transparent conductive layer.

The counter electrode CT is formed of a conductive layer g3 and is electrically connected to the counter voltage signal line CL. The material of the counter electrode CT, in this case, is the same as that of the scanning signal tine GL, but may also be a transparent conductive layer.

The pixel electrode PX and the counter electrode CT arc opposed to each other, and the optical state of the liquid crystal is controlled by an electric field between each of the pixel electrodes PX and the counter electrode C7, thereby controlling a display.

Each pixel electrode PX and counter electrode CT is formed in a comb-teeth like shape, and is an electrode which is elongated in the vertical direction as viewed in FIG. 8.

The number, "O", of the counter electrode CT in one pixel (the number of its comb teeth) and the number, "P", of the pixel electrodes PX (the number of its comb teeth) in one pixel are necessarily selected to have a relationship of 0=P+1 (in the present embodiment, 0=3 and P=2). The counter electrode CT and the pixel electrode PX are alternately arranged and the counter electrode CT is adjacent to the video signal line DL.

The electrode width of each pixel electrode PX and counter electrode CT is 6 μm. This electrode width is set to be sufficiently larger than 3.9 μm, the thickness of a liquid crystal display layer which will be described later, in order to apply a sufficient electric field to the entire liquid crystal display layer in the thickness direction thereof, but is made as small as possible so that the aperture ratio can be made large. The electrode width of the video signal line DL is 8 μm, which is slightly large compared to each of the pixel electrodes PX and the counter electrodes CT, in order to prevent disconnection.

A shield electrode SH, which is not an essential constituent element, is arranged to overlap three kinds of electrodes, i.e., the video signal line DL, the counter electrode CT adjacent to the video signal line DL, and the scanning signal line GL, as shown in FIG. 8, and to be electrically isolated from the three kinds of electrodes by an insulation layer. The shield electrode SH may be made from a metal, an alloy, a transparent conductive layer or the like, and, in this embodiment, is formed of a transparent conductive layer i3.

Figure 9:
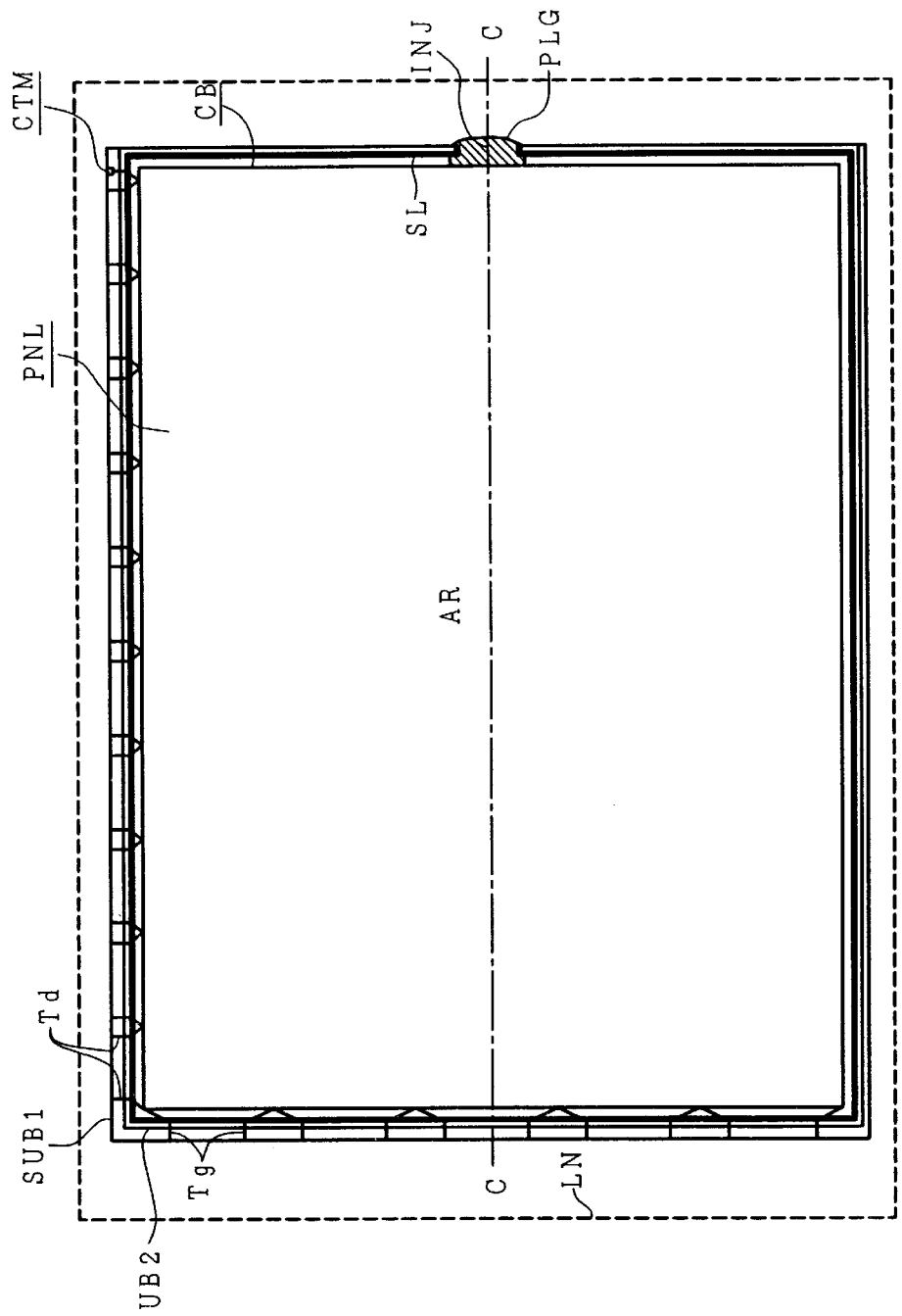
FIG. 9 is a plan view of an essential portion of a liquid crystal display panel PNL which includes two substrates SUB1 and SUB2.

FIG. 9 is a plan view of an essential portion of a liquid crystal display panel PNL which includes two substrates SUB1 and SUB2, and FIG. 10 is a cross-sectional view illustrating the construction of edge portions, cut along line C—C of FIG. 9. The left side of FIG. 10 shows the cross section of the vicinity of an external connecting terminal GTM to which a scanning circuit is to be connected, and the right side of FIG. 10 shows the cross section of the vicinity of a seating portion at which an external connecting terminal is absent.

In the manufacture of such liquid crystal display panels, if they have a small size, to achieve an increase in throughput, a plurality of devices are formed over one glass plate at the same time and the glass plate is divided into individual devices. If the liquid crystal display panels have a large size, to make common use of the manufacturing facilities, a glass substrate having a standardized size is worked irrespective of the kind of product and is then reduced to a size which conforms to each kind of product. In either case, the glass substrate is cut after a series of steps has been completed.

FIGS. 9 and 10 show an example of the latter case, and represent the states of the two substrates SUB1 and SUB2 after cutting. Symbol LN denotes the edges of each of the substrates SUB1 and SUB2 before cutting. In either case, when the liquid crystal display panel is finished, the size of the upper substrate SUB2 is limited to a size smaller than that of the lower substrate SUB1 so as to expose portions in which external connecting terminal groups Tg and Td and terminals COT (the symbol "COM" is omitted in FIGS. 9 and 10) are present (in FIG. 9, the top and left sides of the liquid crystal display panel).

The terminal groups Tg and Td are constructed in such a manner that the external connecting terminal GTM and a video signal circuit connecting terminal DTM and their lead line portions are code-assigned in the units of a plurality of lines for each tape carrier package TCP (not shown) on which an integrated circuit chip CHI is mounted.

As shown in FIG. 9, the sealing material SL is formed to seal the liquid crystal LC between the substrates SUB1 and SUB2 along the edges thereof excluding the filling port INJ for the liquid crystal. This sealing material SL is made of, for example, an epoxy resin. An alignment layer is formed on the inside of the sealing material SL. The filling port INJ is scaled with the end-sealing material PLG after the filling of the liquid crystal.

The polarizers POL1 and POL2 shown in FIG. 10 are respectively formed on the outside surfaces of the substrates SUB1 and SUB2. A liquid crystal LC is sealed in the area closed by the sealing material SL between alignment layers OR11 and OR12 which set the orientation of liquid crystal molecules. The alignment layer OR11 is formed over a protective layer PSVL on the side of the substrate SUB1.

This liquid crystal display panel is assembled by stacking various layers over each of the substrates SUB1 and SUB2, forming the sealing material SL over the substrate SUB2, superposing the substrates SUB1 and SUB2 on each other, filling the liquid crystal LC, through the filling port INJ of the sealing material SL, sealing the filling port INJ with the end-sealing material PLG in which $SiO_2$ is mixed with an epoxy resin or the like, and cutting both substrates SUB1 and SUB2.

FIG. 11 is a diagram showing the equivalent circuit and its peripheral circuit of a display matrix block of a liquid crystal display device using the liquid crystal display panel according to the present invention. FIG. 11 is a circuit diagram which is drawn to correspond to an actual geometric arrangement. Symbol AR denotes a matrix array in which a plurality of pixels are arrayed two-dimensionally.

In FIG. 11, "X" denotes a video signal line DL, and G, B and R are appended to the symbol X to identify green, blue and red pixels, respectively. "Y" denotes a scanning signal line GL, and 1, 2, 3, . . . , end are appended to the symbol Y in accordance with the sequence of scanning timing.

The scanning signal lines Y (whose suffixes are omitted) are connected to a vertical scanning circuit V, and the video signal lines X (whose suffixes are omitted) are connected to a video signal driver circuit H.

A circuit SUP includes an electric power supply circuit for obtaining a plurality of divided stabilized voltage sources from one voltage source, and a CRT→TFF converter circuit for exchanging information for a CRT (cold-cathode tube) received from a host (a host processor) into information for a TFIF liquid crystal display device.

Figure 12:
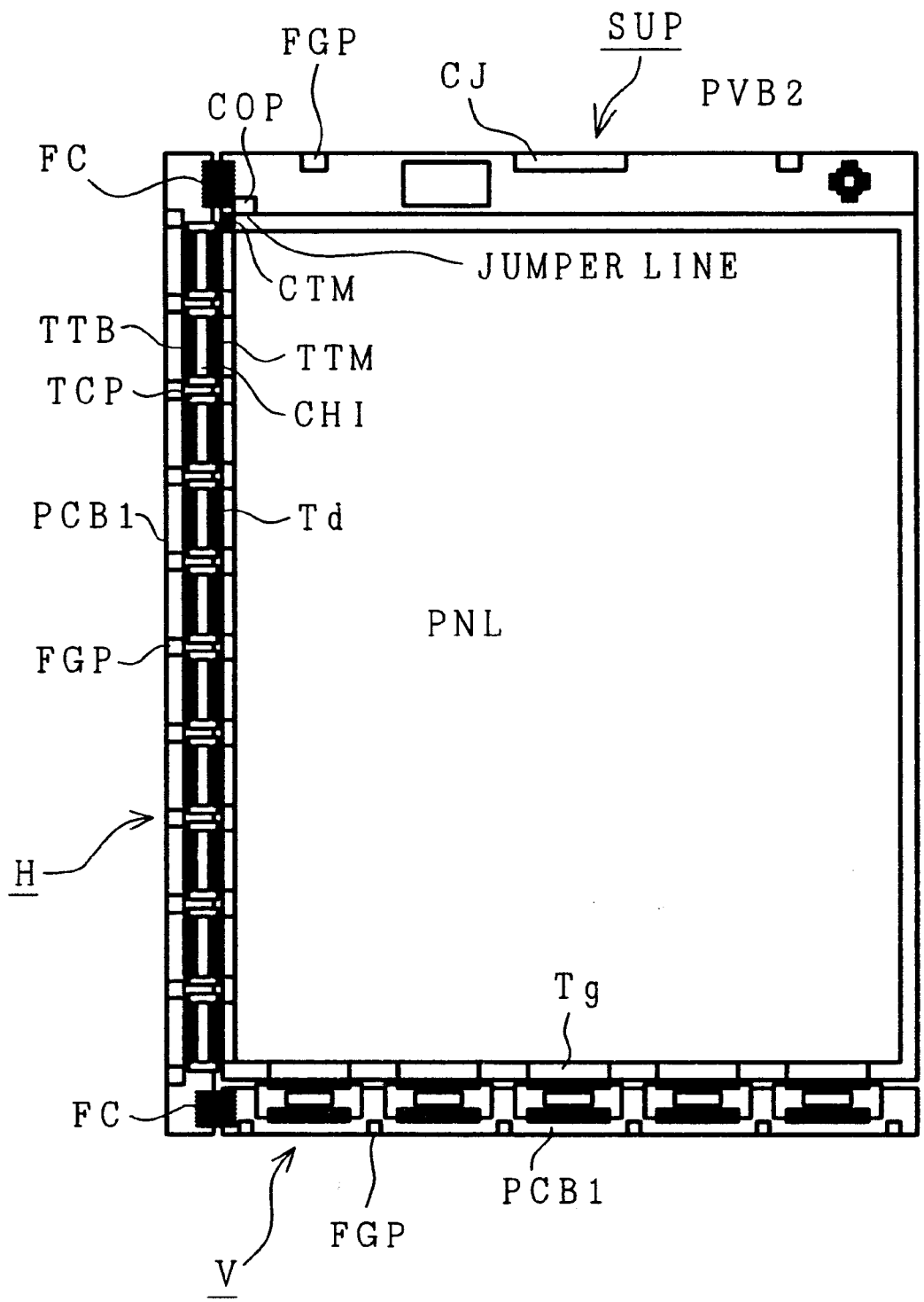
FIG. 12 is a top plan view showing a state in which a video signal driving circuit H and a vertical scanning circuit V are connected to the liquid crystal display panel.

FIG. 12 is a top plan view showing a state in which the video signal driving circuit H and the vertical scanning circuit V are connected to the liquid crystal display panel.

Symbol CHI denotes driver IC chips for driving the liquid crystal display panel PNL (the bottom five are driver IC chips for the vertical scanning circuit V, and the left ten are driver IC chips for the video signal driving circuit H). Symbol TCP denotes tape carrier packages on which the respective driver IC chips are mounted by tape automated boding (TAB). Symbol PCBI denotes a driving circuit board on which the TCPS, capacitors and the like are mounted, and the driving circuit board PCBI is divided into two blocks for accommodating the video signal driving circuit and the scanning signal driving circuit. Symbol FGP denotes a frame ground pad to which to solder springy 9 pieces formed by cutting the shield case SHD (refer to FIG. 13). Symbol FC denotes a flat cable for electrically connecting the bottom driving circuit board PCB1 and the left driving circuit board PCB1. As shown, the flat cable FC uses a cable in which a plurality of lead wires (made of a Sn-plated phosphor bronze material) are sandwiched between a stripe-shaped polyethylene layer and polyvinyl alcohol layer.

Figure 13:
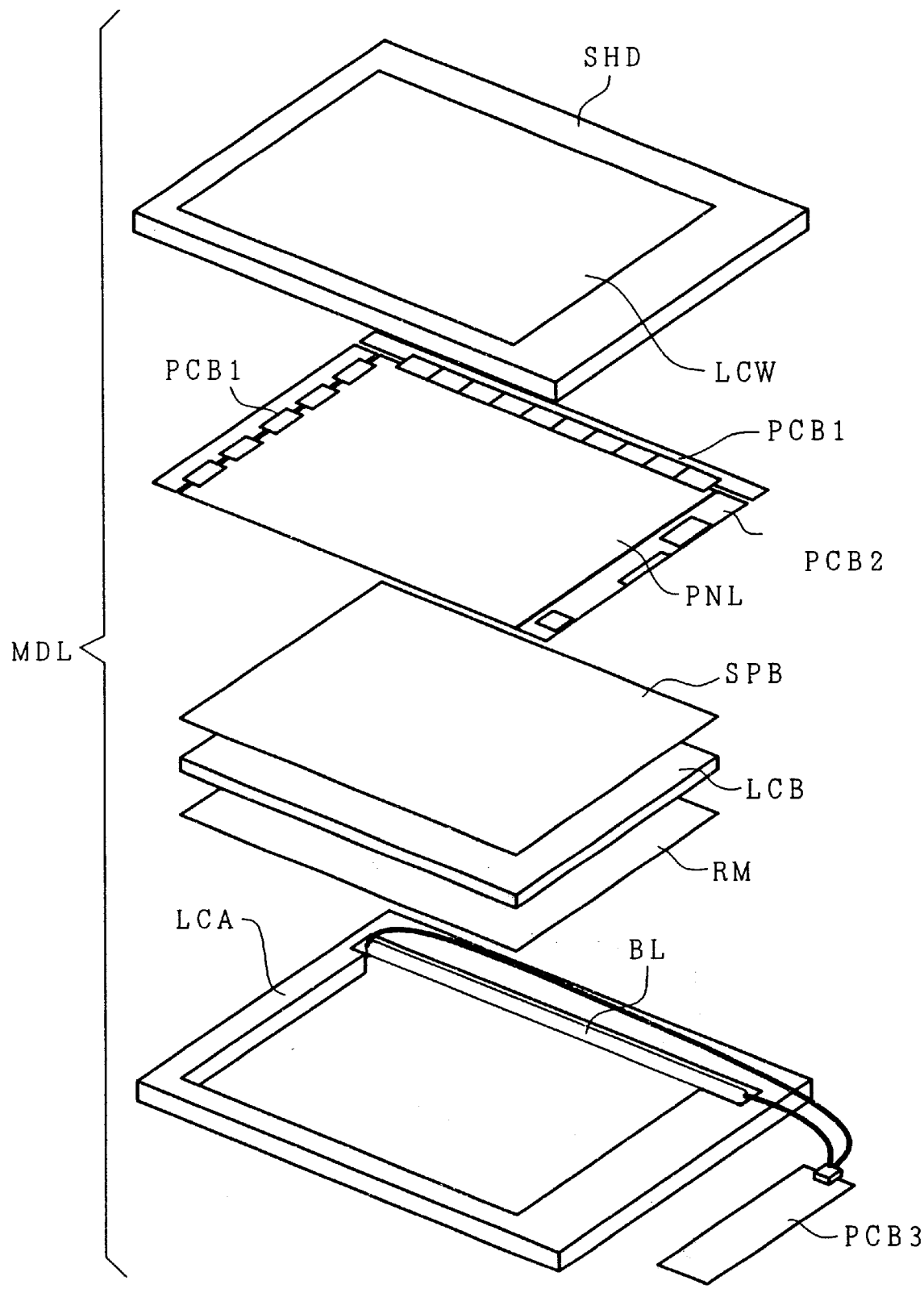
FIG. 13 is an exploded perspective view illustrating the entire construction of a liquid crystal display device using the liquid crystal display panel according to the present invention.

FIG. 13 is a diagrammatic developed perspective view illustrating the entire construction of a liquid crystal display device using the liquid crystal display panel according to the present invention.

Symbol SHD denotes a frame-shaped shield case (a metal frame) made from a metal plate, symbol LCW denotes a display window, symbol PNL denotes a liquid crystal display panel, symbol SPB denotes an optical diffusion sheet, symbol LCB denotes a light guide, symbol RM denotes a reflecting sheet, symbol BL denotes a back light fluorescent tube, and symbol LCA denotes a back light case. A liquid crystal display device (module) MDL is assembled by stacking these members in a layered arrangement as illustrated.

The entire liquid crystal display device MDL is secured by hooks and claws (not shown) provided on the shield case SHD.

The back light case LCA has a shape which accommodates the back light fluorescent tube BL, the optical diffusion sheet SPB, the light guide LCB and the reflecting sheet RM, and converts the light of the back tight fluorescent tube BL arranged on a side of the tight guide LCB into back light which becomes uniform on a display screen, by means of the light guide LCB, the reflecting sheet RM and the optical diffusion sheet SPB, and emits the back tight to the liquid crystal display panel PNL.

An inverter circuit board PCB3 is connected to the back tight fluorescent tube BL and serves as the power supply of the back light fluorescent tube BL.

FIG. 14 is a perspective view of a portable personal computer which is one example of electronic equipment in which a liquid crystal display device using a liquid crystal display panel according to the present invention is mounted.

In this portable personal computer, a keyboard block and a display block are joined together by a hinge, and a CPU which is a host computer is included in the keyboard block, and a liquid crystal display device using a liquid crystal display panel according to the present invention is mounted in the display block.

The liquid crystal display device MDL which is mounted in the display block is constructed of a scanning signal line-side flexible printed circuit board FPC1, a video signal line-side flexible printed circuit board FPC2, an interface board PCB, an inverter power supply IV and the like. Symbol LPC denotes a line cable for supplying electricity from the inverter circuit IV to a fluorescent tube which constitutes a back light assembly.

This notebook personal computer is capable of proving a high-reliability and high-quality image display free from leakage and contamination of a liquid crystal by adopting the construction of each of the above-described embodiments as the liquid crystal display panel.

It is to be noted that the sealing material according to the present invention is not limited to the above-described active matrix type of liquid crystal display device, and can also be similarly applied to a simple matrix type or any other type of liquid crystal display device.

As described above, in accordance with the present invention, it is possible to decrease the shrinkage of an end-sealing material during curing thereof and prevent the end-sealing material from easily peeling off of the substrates, whereby it is possible to provide a liquid crystal display panel of excellent reliability which is prevented from suffering from leakage of a liquid crystal and penetration of external contaminants.

While we have shown and described several embodiments in accordance with the present invention, it is understood that the same is not limited thereto, but is susceptible of numerous changes and modifications as known to those skilled in the art, and we therefore do not wish to be limited to the details shown and described herein, but intend to cover all such changes and modifications as are encompassed by the scope of the appended claims.

What is claimed is:

1. A liquid crystal display panel, comprising:

a pair of substrates opposed to each other across a predetermined gap, at least one of which is transparent;

an electrode group formed over either or both of opposing internal surfaces of said pair of substrates;

an alignment control layer for aligning a molecular orientation of a liquid crystal in a predetermined direction, said alignment control layer being deposited over each of the internal surfaces of said pair of substrates;

a sealing material for bonding peripheries of said pair of substrates to each other, excluding a liquid crystal filling port;

an end-sealing material for sealing said liquid crystal filling port after filling of the liquid crystal and hermetically sealing the liquid crystal in said gap; and a polarizer stacked over a surface of at least one of said pair of substrates, wherein said end-sealing material is made of a resin, and this resin contains particulates of average particle size of 0.1 $\mu$m to 3.5 $\mu$m within a range of 1 volume % to 30 volume %.

2. A liquid crystal display device according to claim 1, wherein the resin of said end-sealing material contains the particulates by 1 volume % to 10 volume %.

3. A liquid crystal display device according to claim 1, wherein the particulates have a transmissivity of at least 1% or more with respect to light of wavelength of 200 nm to 500 nm.

4. A liquid crystal display device according to claim 1, wherein the resin of said end-sealing material contains at least two kinds of particulates having different average particle sizes.

5. A liquid crystal display device according to claim 1, wherein the particulates are formed of at least one material selected from the group consisting of hard resins and glasses.

6. A liquid crystal display device according to claim 1, wherein the particulates are treated with a silica coupling material.

7. A liquid crystal display panel, comprising:

a pair of substrates opposed to each other across a predetermined gap, at least one of which is transparent;

an electrode group formed over either or both of opposing internal surfaces of said pair of substrates;

an alignment control layer for aligning a molecular orientation of a liquid crystal, said alignment control layer being deposited over each of the internal surfaces of said pair of substrates;

a scaling material for bonding peripheries of said pair of substrates to each other, excluding a liquid crystal filling port;

an end-scaling material for scaling said liquid crystal filling port after filling of the liquid crystal and hermetically sealing the liquid crystal in said gap; and a polarizer stacked over a surface of at least one of said pair of substrates, wherein said end-scaling material contains particulates larger than the gap in an outside area of said liquid crystal filling port.

8. A liquid crystal display device according to claim 7, wherein the particulates are formed of at least one material selected from the group consisting of SiO$_2$, hard resins and glasses.

9. A liquid crystal display device according to claim 7, wherein the particulates are treated with a silica coupling material.

10. A liquid crystal display device according to claim 7, wherein the particulates are formed of at least one material selected from the group consisting of SiO$_2$, hard resins and glasses and arc treated with a silica coupling material.

* * * * *